UNITED STATES PATENT OFFICE.

EMILE LAMM, OF NEW ORLEANS, LOUISIANA.

IMPROVED METHOD OF PREPARING GOLD FOR FILLING TEETH.

Specification forming part of Letters Patent No. 65,399, dated June 4, 1867.

*To all whom it may concern:*

Be it known that I, EMILE LAMM, of the city of New Orleans, parish of Orleans, and State of Louisiana, have discovered a new, useful, and Improved Method of Making Crystallized Fibrous Gold of a form, nature, and consistency especially adapted to filling carious teeth, and for other purposes; and I do hereby declare the following to be a full, clear, and exact description thereof.

I first make a solution of gold in nitro-muriatic acid by the usual process best known to chemists and metallurgists, which I decant, as soon as the gold is dissolved, into a glass balloon with the top cut off, so as to make it present the form of a deep evaporating-dish. I then take of gum-arabic, dissolved in one-third as much boiling water as I have of gold solution, double the weight of the gold in solution, and pour one-tenth part of the same into the gold solution. The latter is now placed over a steam-bath, and the effect of the admixture with it of the gum solution is to quickly free it of all excess of nitric acid, which passes off in the form of nitrous-acid fumes. Immediately following the expulsion of the nitric acid, bright but minute crystals of gold make their appearance, gradually forming along the sides and at the bottom of the vessel in which the solution is contained in the shape of arborescent coherent fibers. As soon as the fibers are strong enough to bear handling I lift them out of the solution with a dipper of vulcanized india-rubber, to which a glass rod has been attached, and place them upon a porcelain dripper, in such manner that the drippings will fall back into the solution. I now wash the mass of fibers from time to time with the gum solution, which hastens the process, taking care so to regulate the quantity I use as to make the gum solution last to the end of the process. After the process is concluded, I wash with rain-water, allowing the first water, which carries with it a little unreduced gold solution, to drip into the mother liquid. My next step is to remove the dripper, and, placing it over a convenient vessel, to pour large quantities of water upon the fibers. When the water, which runs very fast through the fibers, becomes clear and tasteless, I wash with aqua-ammonia and water again, and this terminates the whole process. The result is a mass of bright gold fibers, which approximate more nearly to absolutely pure gold than any hitherto known in the arts or to chemists, and which, when heated to a dull-red heat, possess a most extraordinary and astonishing degree of coherency and plasticity—qualities of incalculable value to the dental profession, as well as for many other purposes that need not be herein specified.

The valuable discovery I claim to have made lies in the fact that gold is thrown down in the metallic state from its solutions not previously evaporated to dryness to drive off the excess of acid by the use of gum-arabic, or any other soluble gum or organic substance soluble in the solutions of gold, which rise gradually from a lower to a higher grade of oxidation by reason of the power which said substances possess of precipitating gold in the form, or any other form, or by any other process substantially the same as herein specified.

Having thus described my discovery, what I claim, and desire to secure by Letters Patent, is—

The use of all organic substances soluble in solutions of gold, with the exception of saccharine substances, for making crystallized fibrous gold, by any process substantially the same as that herein described, for the purpose set forth.

E. LAMM.

Witnesses:
RUFUS R. RHODES,
C. W. WAILEY.